US012626171B2

(12) United States Patent
Maslov et al.

(10) Patent No.: US 12,626,171 B2
(45) Date of Patent: May 12, 2026

(54) HADAMARD-FREE CLIFFORD CIRCUITS OVER LINEAR NEAREST NEIGHBOR ARCHITECTURE

(71) Applicant: INTERNATIONAL BUSINESS MACHINES CORPORATION, Armonk, NY (US)

(72) Inventors: Dmitri Maslov, Great Falls, VA (US); Muye Yang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 685 days.

(21) Appl. No.: 18/050,035

(22) Filed: Oct. 26, 2022

(65) Prior Publication Data

US 2024/0152791 A1     May 9, 2024

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/20
See application file for complete search history.

(56) References Cited

U.S. PATENT DOCUMENTS

2023/0259804 A1* 8/2023 Grzesiak ................ G06N 10/40
716/100

OTHER PUBLICATIONS

Kissinger et al., "Reducing the number of non-Clifford gates in quantum circuits", Aug. 11, 2020, Physical Review A102,022406(2020), pp. 1-10. (Year: 2020).*
M. Ketchen, "ERSFQ Power Delivery: A Self-Consistent Model/Hardware Case Study," IEEE Trans. Appl. Supercond., vol. 28, No. 7, Oct. 2019.
Aaronson et al., "Improved Simulation of Stabilizer Circuits", Phys. Rev. A 70, Jun. 18, 2008, 15 pages.
Bravyi et al., "Hadamard-Free Circuits Expose the Structure of the Clifford Group", IEEE Transactions on Information Theory, vol. 67, No. 7, Jul. 2021, 18 pages.
Kutin et al., "Computation at a Distance", Jan. 26, 2007, 19 pages.
Maslov et al., "Shorter stabilizer circuits via Bruhat decomposition and quantum circuit transformations", IEEE Transactions on Information Theory, May 2007, 10 pages.

* cited by examiner

*Primary Examiner* — Brent Johnston Hoover
(74) *Attorney, Agent, or Firm* — Amin, Turocy & Watson, LLP

(57) ABSTRACT

According to an embodiment of the present invention, a method, system, and computer program product for reducing and performing quantum circuits. The Embodiment may include receiving, by a classical computer, a quantum circuit comprising a CZ layer and a CNOT layer. The Embodiment may include creating, by a classical computer, a modified quantum circuit based on the CZ layer and the CNOT layer, wherein the modified quantum circuit includes phase gates with CNOT gates that perform similar functions of the CZ gates in the CZ layer. The embodiment may include performing, on a quantum computer, the modified quantum circuit. The embodiment may reduce the depth of a quantum circuit, thereby enabling faster and more accurate computation of the quantum circuit.

17 Claims, 8 Drawing Sheets

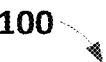

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

QUANTUM CIRCUIT TRANSFORMATION
MODULE
299

PERIPHERAL DEVICE SET 114

UI DEVICE SET 123          STORAGE 124          IoT SENSOR SET 125

NETWORK MODULE 115

END USER DEVICE 103

REMOTE SERVER 104

REMOTE DATABASE 130

WAN 102

PRIVATE CLOUD 106

GATEWAY 140

PUBLIC CLOUD 105

CLOUD ORCHESTRATION MODULE
141

HOST PHYSICAL MACHINE SET 142

VIRTUAL MACHINE SET 143          CONTAINER SET 144

*FIG. 1*

Receiving a Quantum Computing Circuit
310

Modify the Quantum Computing Circuit
320

Performing the Quantum Circuit on the Quantum Computer
330

Figures 5A, 5B:
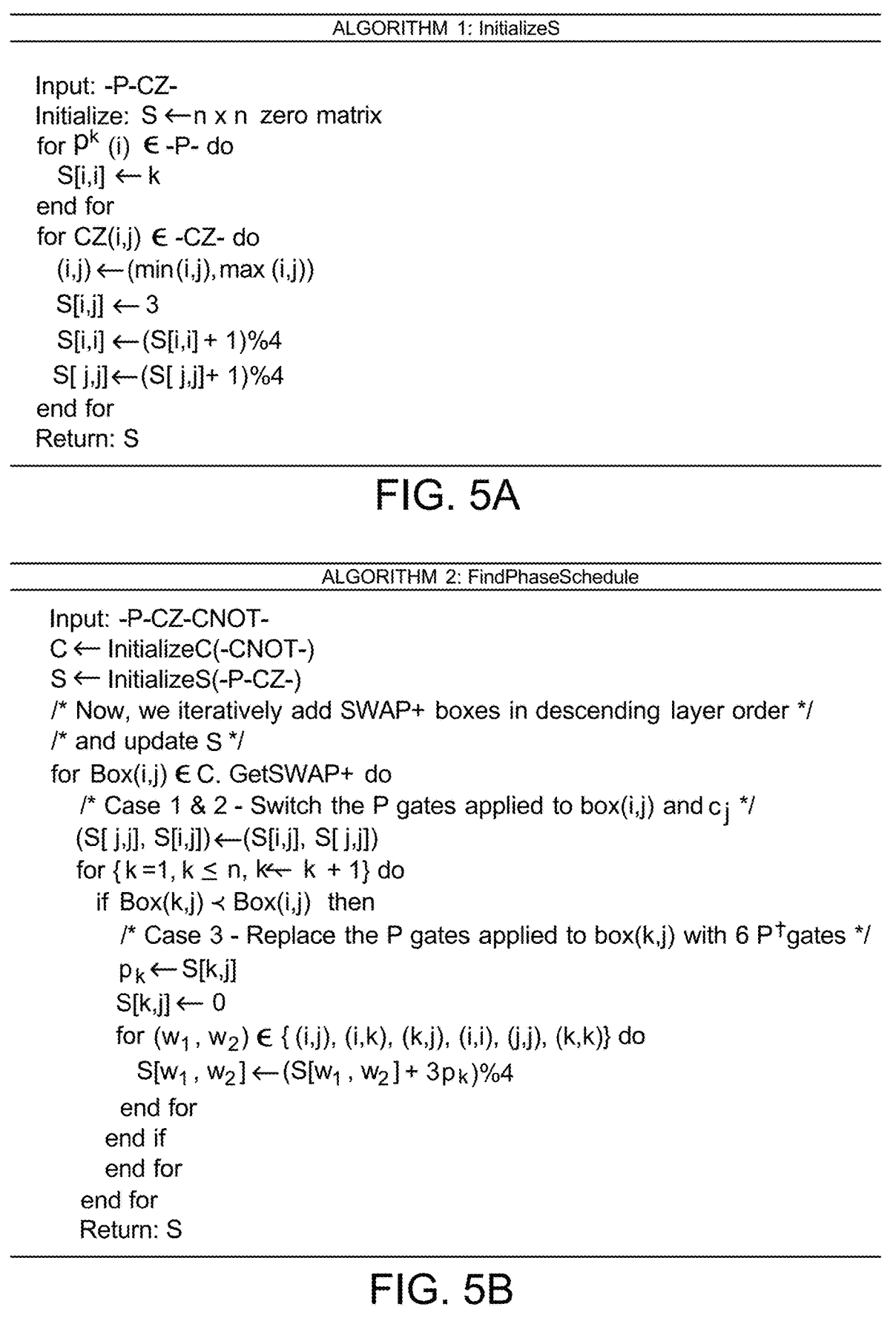

---
ALGORITHM 1: InitializeS
---

Input: -P-CZ-
Initialize: $S \leftarrow n \times n$ zero matrix
for $P^k$ (i) $\in$ -P- do
  $S[i,i] \leftarrow k$
end for
for CZ(i,j) $\in$ -CZ- do
  $(i,j) \leftarrow (\min(i,j), \max(i,j))$
  $S[i,j] \leftarrow 3$
  $S[i,i] \leftarrow (S[i,i] + 1)\%4$
  $S[j,j] \leftarrow (S[j,j] + 1)\%4$
end for
Return: S

---
ALGORITHM 2: FindPhaseSchedule
---

Input: -P-CZ-CNOT-
$C \leftarrow$ InitializeC(-CNOT-)
$S \leftarrow$ InitializeS(-P-CZ-)
/* Now, we iteratively add SWAP+ boxes in descending layer order */
/* and update S */
for Box(i,j) $\in$ C. GetSWAP+ do
  /* Case 1 & 2 - Switch the P gates applied to box(i,j) and $c_j$ */
  $(S[j,j], S[i,j]) \leftarrow (S[i,j], S[j,j])$
  for $\{k = 1, k \leq n, k \leftarrow k + 1\}$ do
    if Box(k,j) $\prec$ Box(i,j) then
      /* Case 3 - Replace the P gates applied to box(k,j) with 6 $P^\dagger$ gates */
      $p_k \leftarrow S[k,j]$
      $S[k,j] \leftarrow 0$
      for $(w_1, w_2) \in \{(i,j), (i,k), (k,j), (i,i), (j,j), (k,k)\}$ do
        $S[w_1, w_2] \leftarrow (S[w_1, w_2] + 3p_k)\%4$
      end for
    end if
  end for
end for
Return: S

HADAMARD-FREE CLIFFORD CIRCUITS OVER LINEAR NEAREST NEIGHBOR ARCHITECTURE

BACKGROUND

The present invention relates to Quantum Computing, and more specifically, to circuit transformations to improve the performance of quantum computers.

SUMMARY

According to an embodiment of the present invention, a method, system, and computer program product for reducing and performing quantum circuits. The Embodiment may include receiving, by a classical computer, a quantum circuit comprising a CZ layer and a CNOT layer. The Embodiment may include creating, by a classical computer, a modified quantum circuit based on the CZ layer and the CNOT layer, wherein the modified quantum circuit includes phase gates with CNOT gates that perform similar functions of the CZ gates in the CZ layer. The embodiment may include performing, on a quantum computer, the modified quantum circuit. The embodiment may reduce the depth of a quantum circuit, thereby enabling faster and more accurate computation of the quantum circuit.

The embodiment above may further include an embodiment where the quantum circuit further comprises a phase layer including one or more phase gates, and wherein creating the modified quantum circuit includes modifying phase gates of the phase layer based on the CZ gates in the CZ layer. The embodiment may reduce the depth of a quantum circuit, thereby enabling faster and more accurate computation of the quantum circuit.

The embodiment(s) above may further include an embodiment of creating the modified quantum circuit by determining a CNOT gate of the CNOT layer corresponding to a CZ gate of the CZ layer, wherein an operation performed by the CZ gate is included in an operation of the CNOT gate. Creating the modified quantum circuit may further include determining one or more phase gates to apply to one or more CNOT gates such that the operation of the one or more phase gates and the one or more CNOT gates provides the same result as the CZ layer and the CNOT layer. The embodiment may reduce the depth of a quantum circuit, thereby enabling faster and more accurate computation of the quantum circuit.

The embodiment(s) above may further include an embodiment where the CNOT layer having swap gates and swap+ gates. The embodiment may also determine an initial phase gate for each CNOT gate, wherein the phase gate is applied as if it were a swap gate containing an equivalent calculation to a CZ gate from the CZ layer. The embodiment may for each swap+ gate replace the swap gate used to determine the initial phase gate with a swap+ gate; determine an updated phase gate based on the replaced swap+ gate; and repeat until all swap+ gates in original CNOT layer are introduced and an updated phase gate layer is created. The embodiment may reduce the depth of a quantum circuit to 5n by eliminating the CZ layer, thereby enabling faster and more accurate computation of the quantum circuit.

The embodiment(s) above may further include an embodiment where determining the initial phase gate comprises applying a phase gate to each swap gate containing an equivalent calculation to a CZ gate from the CZ layer. The embodiment may reduce the depth of a quantum circuit to 5n by eliminating the CZ layer, thereby enabling faster and more accurate computation of the quantum circuit.

The embodiment(s) above may further include an embodiment where determining the updated phase gates comprises updating six phase gates. The embodiment may reduce the depth of a quantum circuit to 5n by eliminating the CZ layer, thereby enabling faster and more accurate computation of the quantum circuit.

The embodiment(s) above may further include an embodiment where determining the updated phase gates is based on: $a \oplus b \oplus c + a \oplus b + a \oplus c + b \oplus c + a + b + c \equiv 0 \pmod 4$. The embodiment may reduce the depth of a quantum circuit to 5n by eliminating the CZ layer, thereby enabling faster and more accurate computation of the quantum circuit.

BRIEF DESCRIPTION OF THE DRAWINGS

FIG. 1 depicts an classical computing system, according to an exemplary embodiment;

FIGS. 5A and 5B depict pseudo-code for implement portions of the process flow of FIG. 4, according to an exemplary embodiment.

DETAILED DESCRIPTION

Figure 2A:
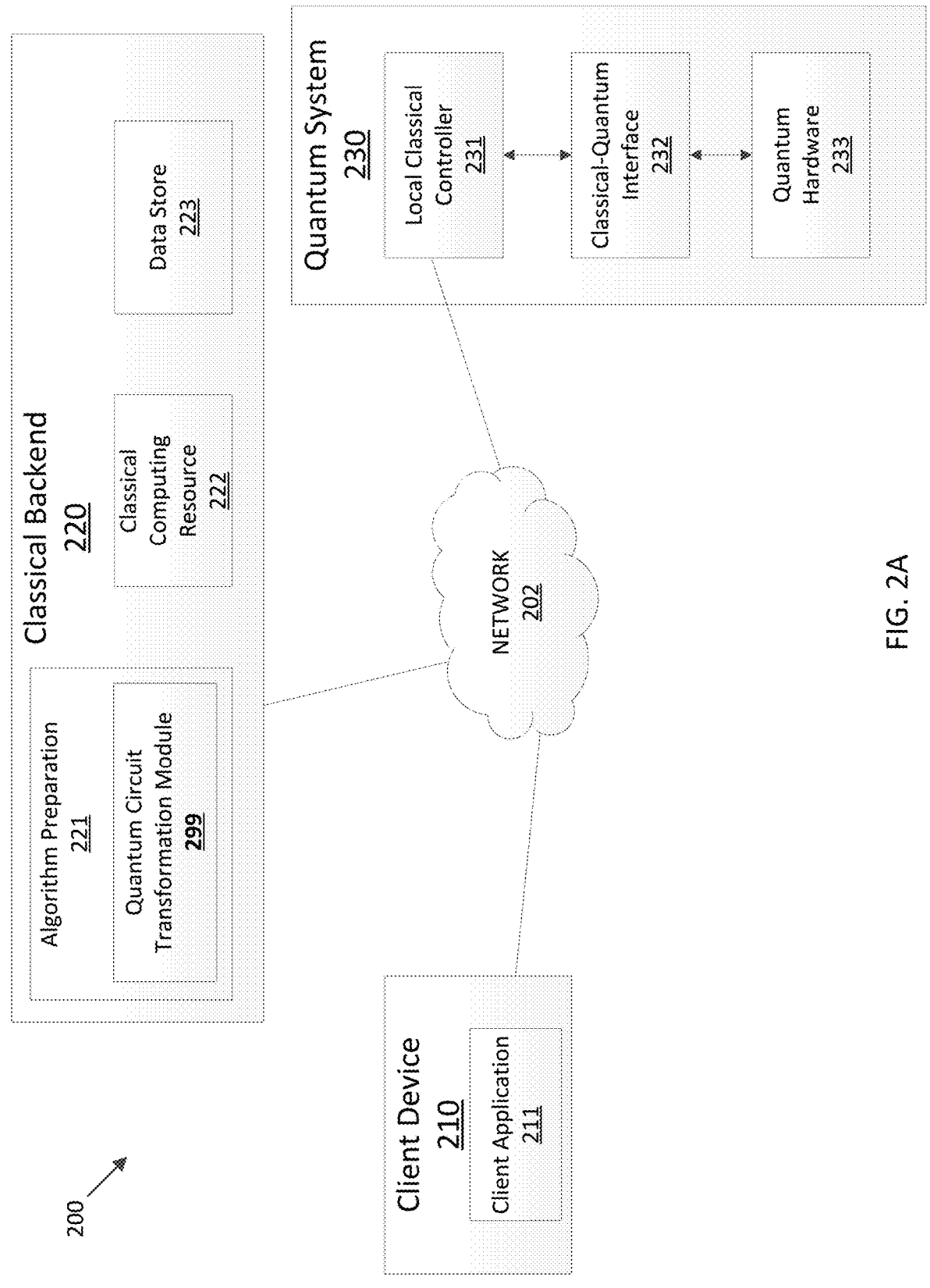
FIG. 2A depicts an environment containing classical and quantum computers for performing quantum and hybrid computations, according to an exemplary embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Quantum Circuit Transformation Module 299. In addition to block 299, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2A illustrates a block diagram of an example hybrid computing system 200 that can facilitate execution of a quantum algorithm. As shown, a client device 210 may interface with a classical backend 220 to enable computations with the aid of a quantum system 230.

Network 202 may be any combination of connections and protocols that will support communications between the client device 210, the classical backend 220, and the quantum system 230. In an example embodiment, network 202 may WAN 102.

Client device 210 may be an implementation of computer 101 or EUD 103, described in more detail with reference to FIG. 1, configured to operate in a hybrid computing system 200.

Client application 211 may include an application or program code that includes computations requiring a quantum algorithm or quantum operation. In an embodiment, client application 211 may include an object-oriented programming language, such as Python® ("Python" is a registered trademark of the Python Software Foundation), capable of using programming libraries or modules containing quantum computing commands or algorithms, such as QISKIT ("QISKIT" is a registered trademark of the International Business Machines Corporation). In another embodiment, client application 211 may include machine level instructions for performing a quantum circuit, such as OpenQASM. Additionally, user application may be any other high-level interface, such as a graphical user interface, having the underlying object oriented and/or machine level code as described above.

The classical backend 220 may be an implementation of computer 101, described in more detail with reference to FIG. 1, having program modules configured to operate in a hybrid computing system 200. Such program modules for classical backend 220 may include algorithm preparation 221, classical computation 222, and data store 223.

Algorithm preparation 221 may be a program or module capable of preparing algorithms contained in client application 211 for operation on quantum system 230 and includes Quantum Circuit Transformation Module 299. Algorithm preparation 221 may be instantiated as part of a larger algorithm, such as a function call of an API, or by parsing a hybrid classical-quantum computation into aspects for quantum and classical calculation. Algorithm preparation 221 may additionally compile or transpile quantum circuits that were contained in client application 211 into an assembly language code for use by the local classical controller 231. During transipilation/compilation an executable quantum circuit in the quantum assembly language may be created based on the calculations to be performed, the data to be analyzed, and the available quantum hardware. In one example embodiment, algorithm preparation 221 may select a quantum circuit from a library of circuits that have been designed for use in a particular problem. In another example embodiment, algorithm preparation 221 may receive a quantum circuit from the client application 211 and may perform transformations on the quantum circuit to make the circuit more efficient, or to fit the quantum circuit to available architecture of the quantum processor 233. Additionally, algorithm preparation 221 may prepare classical data from data store 223, or client application 211, as part of the assembly language code for implementing the quantum circuit by the local classical controller 231. Algorithm preparation 221 may additionally set the number of shots (i.e., one complete execution of a quantum circuit) for each circuit to achieve a robust result of the operation of the algorithm. Further, algorithm preparation 221 may update, or re-compile/re-transiple, the assembly language code based on parallel operations occurring in classical computing resource 222 or results received during execution of the quantum calculation on quantum system 230. Additionally, algorithm preparation 221 may determine the criterion for convergence of the quantum algorithm or hybrid algorithm.

Quantum Circuit Transformation Module 299 may form a portion of a portion of algorithm preparation 221. Quantum Circuit Transformation Module 299 may reduce quantum circuits having Hadamard-free Clifford transformations. Specifically, Quantum Circuit Transformation module may take circuits having Phase, CZ, and CNOT gates and reduce such circuits by removing CZ gates whose calculations can be merged into the operations performed by CNOT gates while adding/modifying a phase gate to be performed in conjunction with the CNOT gates. In instances where quantum processor 233 has a Linear Nearest Neighbor (LNN) architecture, all CZ gates may be removed and the depth of the entire circuit will be no more than 5n (where n is the number of qubits). The operations of Quantum Circuit Transformation Module 299 are discussed in more detail in with respect to FIG. 3, FIG. 4, FIG. 5A, and FIG. 5B.

Classical computing resource 222 may be a program or module capable of performing classical (e.g., binary, digital) calculations contained in client application 211. Classical calculations may include formal logical decisions, AI/ML algorithms, floating point operations, and/or simulation of Quantum operations.

Data store 223 may be a repository for data to be analyzed using a quantum computing algorithm, as well as the results of such analysis. Data store 223 may be an implementation of storage 124 and/or remote database 130, described in more detail with reference to FIG. 1, configured to operate in a hybrid computing system 200.

The quantum system 230 can be any suitable set of components capable of performing quantum operations on a physical system. In the example embodiment depicted in FIG. 2, quantum system 230 includes a local classical controller 231, a classical-quantum interface 232, and quantum processor 233. In some embodiments, all or part of each of the local classical controller 231, a classical-quantum interface 232, and quantum processor 233 may be located in a cryogenic environment to aid in the performance of the quantum operations. In an embodiment, classical backend 220 and quantum system 230 may be co-located to reduce the communication latency between the devices.

Local classical controller 231 may be any combination of classical computing components capable of aiding a quantum computation, such as executing a one or more quantum operations to form a quantum circuit, by providing commands to a classical-quantum interface 232 as to the type and order of signals to provide to the quantum processor 233. Local classical controller 231 may additionally perform other low/no latency functions, such as error correction, to enable efficient quantum computations. Such digital computing devices may include processors and memory for storing and executing quantum commands using classical-quantum interface 232. Additionally, such digital computing devices may include devices having communication protocols for receiving such commands and sending results of the performed quantum computations to classical backend 220. Additionally, the digital computing devices may include communications interfaces with the classical-quantum interface 232. In an embodiment, local classical controller 231 may include all components of computer 101, or alternatively may be individual components configured for specific quantum computing functionality, such as processor set 110, communication fabric 111, volatile memory 112, persistent storage 113, and network module 115.

Classical-quantum interface 232 may be any combination of devices capable of receiving command signals from local classical controller 231 and converting those signals into a format for performing quantum operations on the quantum processor 233. Such signals may include electrical (e.g., RF, microwave, DC) or optical signals to perform one or more single qubit operations (e.g., Pauli gate, Hadamard gate, Phase gate, Identity gate), signals to perform multi-qubit operations (e.g., CNOT-gate, CZ-gate, SWAP gate, Toffoli gate), qubit state readout signals, and any other signals that might enable quantum calculations, quantum error correction, and initiate the readout of a state of a qubit. Additionally, classical-quantum interface 232 may be capable of converting signals received from the quantum processor 233 into digital signals capable of processing and transmitting by local classical controller 231 and classical backend 220. Such signals may include qubit state readouts. Devices included in classical-quantum interface 232 may include, but are not limited to, digital-to-analog converters, analog-to-digital converters, waveform generators, attenuators, amplifiers, filters, optical fibers, and lasers Quantum processor 233 may be any hardware capable of using quantum states to process information. Such hardware may include a collection of qubits, mechanisms to couple/entangle the qubits, and any required signal routings to communicate between qubits or with classical-quantum interface 232 in order to process information using the quantum states. Such qubits may include, but are not limited to, charge qubits, flux qubits, phase qubits, spin qubits, and trapped ion qubits. The architecture of quantum processor 233, such as the arrangement of data qubits, error correcting qubits, and the couplings amongst them, may be a consideration in performing a quantum circuit on quantum processor 233.

Figure 2B:
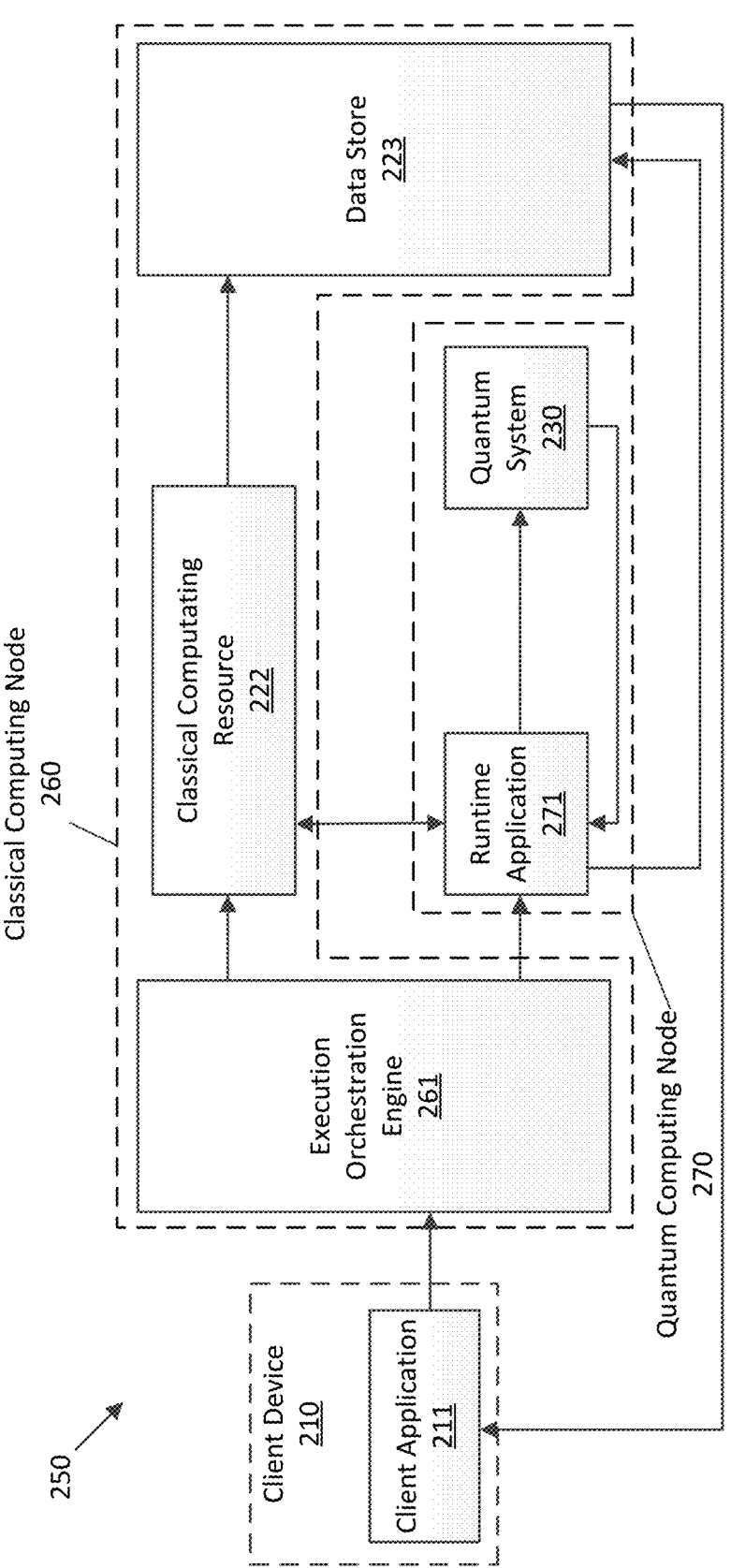
FIG. 2B depicts an example process flow for performing quantum and hybrid computations using the classical and quantum computers of FIG. 2A, according to an exemplary embodiment.
Figure 3:
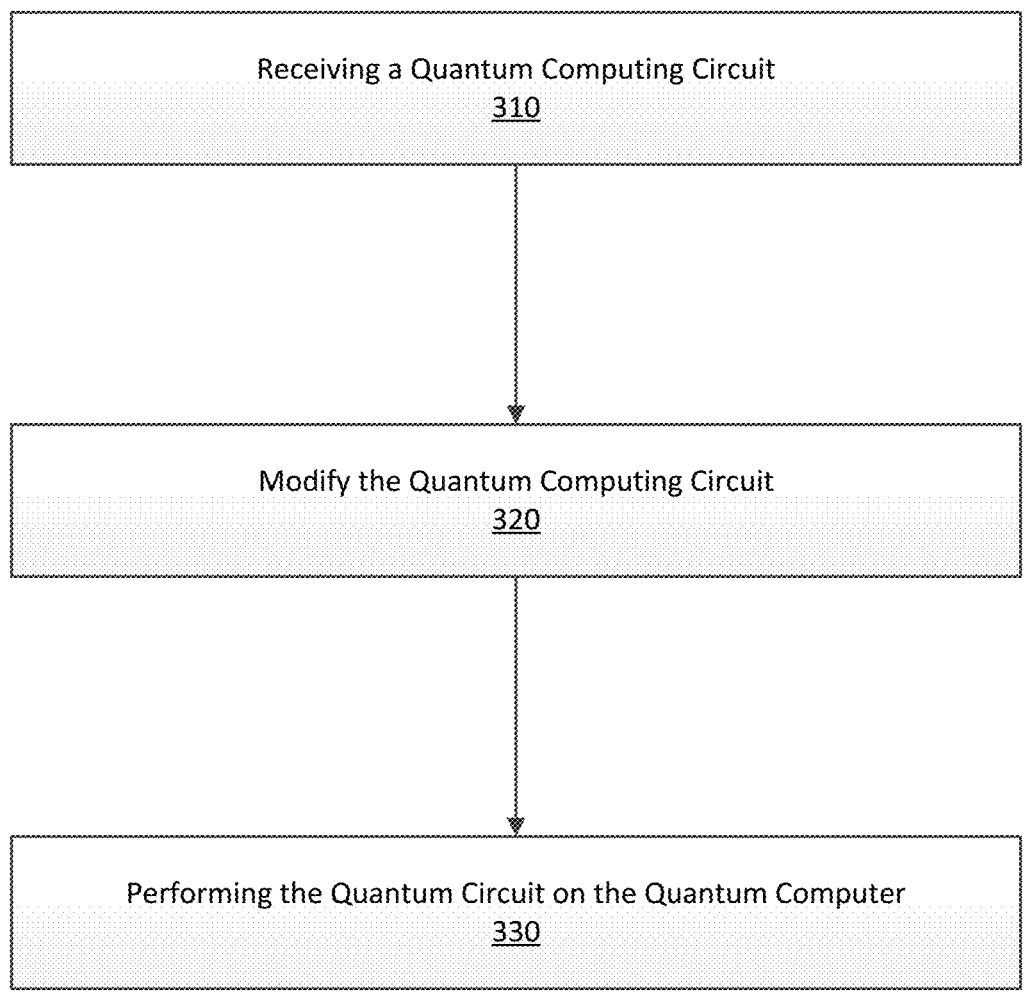
FIG. 3 depicts a process flow of reducing and executing a quantum circuit, according to an exemplary embodiment.

Referring now to FIG. 2B, a block diagram is depicted showing an example architecture, and data transmission, of hybrid computation system 250 employed using a cloud architecture for classical backend 220. Hybrid computation system 250 receives an algorithm containing a computation from a client application 211 of client device 210. Upon receipt of the algorithm and request from client application 211, hybrid computation system 250 instantiates a classical computing node 260 and a quantum computing node 270 to manage the parallel computations. The classical computing node 260 may include one or more classical computers capable of working in tandem. For example, classical computing node 260 may include an execution orchestration engine 261, one or more classical computation resources 222, and a result data store 223. The backend quantum runtime system 202 may include a combination of classical and quantum computing components acting together to perform quantum calculations on quantum hardware including, for example, one or more quantum systems 230. The quantum computing node 270 may include a quantum runtime application 271 and one or more quantum systems 230.

The client application 211 may include programing instructions to perform quantum and classical calculations. In an embodiment, client application 211 may be in a general purpose computing language, such as an object oriented computing language (e.g., Python®), that may include classical and quantum functions and function calls. This may enable developers to operate in environments they are comfortable with, thereby enabling a lower barrier of adoption for quantum computation.

The execution orchestration engine 261, in using algorithm preparation 221, may parse the client application 211 into a quantum logic/operations portion for implementation on a quantum computing node 270, and a classical logic/operations portion for implementation on a classical node 260 using a classical computation resource 222. In an embodiment, parsing the client application 211 may include performing one or more data processing steps prior to operating the quantum logic using the processed data. In an embodiment, parsing the client application 211 may including segmenting a quantum circuit into portions that are capable of being processed by quantum computing node 270, in which the partial results of each of the segmented quantum circuits may be recombined as a result to the quantum circuit. Execution orchestration engine 261 may parse the hybrid algorithm such that a portion of the algorithm is performed using classical computation resources 222 and a session of quantum computing node 270 may open to perform a portion of the algorithm. Quantum runtime application 271 may communicate, directly or indirectly, with classical computation resources 222 by sending parameters/information between the session to perform parallel calculations and generate/update instructions of quantum assembly language to operate quantum system 230, and receiving parameters/information/results from the session on the quantum system 230. Following the parsing of the hybrid algorithm for calculation on quantum computing node 270 and classical computing node 260, the parallel nodes may iterate the session to convergence by passing the results of quantum circuits, or partial quantum circuits, performed on quantum system 230 to classical computing resource 222 for further calculations. Additionally, runtime application 271, using algorithm preparation 221, may re-parse aspects of the hybrid algorithm to improve convergence or accuracy of the result. Such operation results, and progress of convergence, may be sent back to client device 210 as the operations are being performed. By operating execution orchestration engine 261 in a cloud environment, the environment may scale (e.g., use additional computers to perform operations necessary) as required by the client application 211 without any input from the creators/implementors of client application 211. Additionally, execution orchestration engine 261, while parsing the client application 211 into classical and quantum operations, may generate parameters, function calls, or other mechanisms in which classical computation resource 222 and quantum computing node 270 may pass information (e.g., data, commands) between the components such that the performance of the computations enabled by client application 211 is efficient.

Classical computation resources 222 may perform classical computations (e.g., formal logical decisions, AI/ML algorithms, floating point operations, simulation of Quantum operations) that aid/enable/parallelize the computations instructed by client application 211. By utilizing classical computation resources 222 in an adaptively scalable environment, such as a cloud environment, the environment may scale (e.g., use additional computers to perform operations necessary including adding more classical computation resources 222, additional quantum systems 230, and/or additional resources of quantum systems 230 within a given quantum computing node 270) as required by the client application 211 without any input from the creators/implementors/developers of client application 211, and may appear seamless to any individual implementing client application 211 as there are no required programming instructions in client application 211 needed to adapt to the classical computation resources 222. Thus, for example, such scaling of quantum computing resources and classical computing resources may be provided as needed without user intervention. Scaling may reduce the idle time, and thus reduce capacity and management of computers in classical computing node 260.

Result data store 223 may store, and return to client device 210, states, configuration data, etc., as well as the results of the computations of the client application 211.

Implementation of the systems described herein may enable hybrid computing system 200, through the use of quantum system 230, to process information, or solve problems, in a manner not previously capable. The transpiling of the quantum algorithm, by Quantum Circuit Transformation Module 299, into a reduced quantum circuit for calculation may achieve efficient and accurate quantum calculations from the quantum system 230. Additionally, the quantum assembly language created by classical backend 220 may enable quantum system 230 to use quantum states to perform calculations in a more efficient and accurate manner by reducing the depth of the circuits to 5n for the LNN case. Additionally, such improvement may reduce the classical resources required to perform the calculation of the quantum or hybrid algorithm, by improving the run-time efficiency of the quantum system 230.

Clifford circuits are truly ubiquitous in quantum computing. They appeared early in the study of quantum computations. In an early theory effort the Bernstein-Vazirani algorithm, which is a Clifford circuit in its entirety, served to establish a separation between quantum and classical computational computations in the black-box model. In early (as well as modern) experimental work randomized benchmarking, performed entirely by Clifford circuits, was found to be a powerful tool of establishing the quality of quantum gates/computations. Clifford circuits are what quantum error correction is based on, including both logical state encoding (as well as the entire underlying formalism) and state purification required to perform non-Clifford gates. Fault-tolerant and even physical-level circuits (although slightly less so) are frequently considered over Clifford+T and/or Clifford+Rz libraries—the role of the Clifford circuits follows from the names themselves. Other notable use cases include shadow tomography, study of entanglement, and more.

The current applications focuses on quantum circuits for Hadamard-free Clifford computation composed of Phase (P), CZ and CNOT Gates. These gates may be defined by the transformations the perform over bases states, as follows:

$P$ gate: $P(x): |x\rangle \to i^x |x\rangle$, $CZ$ gate: $CZ(x, y): |x, y\rangle \to (-1)^{xy} |x, y\rangle$ $CNOT$ gate: $CNOT(x, y): |x, y\rangle \to |x, x \oplus y\rangle$ $SWAP$ gate: $SWAP(i, j) = CNOT(i, j) CNOT(j, i) CNOT(i, j)$ $SWAP+$ gate: $SWAP+(i, j) = CNOT(i, j) CNOT(j, i)$ Such circuits compute all Hadamard-free Clifford transformations and form a finite group. It was shown that the circuits with Phase (P), CZ, and CNOT gates can be computed as a three-stage layered computation -P-CZ-CNOT-, where each layer can be composed using the gates of its specified type. This layered computation offers an efficient way of implementing Hadamard-free circuits. Indeed, -P-layer may consist of the gates ID (identity), P, Z=P^2, and P†=P^3 on each qubit, and thus is trivial to compose. A -CZ-layer can be implemented straightforwardly and optimally by CZ gates alone (see next paragraph). A -CNOT- layer, also known as linear reversible circuits, has been studied extensively. Here, we employ rules to reduce the depth of the decomposition -P-CZ-CNOT- by mixing the individual layers.

First, some basic properties of circuits composed with CZ gates. CZ(x, y)=CZ(y, x), meaning the order of control and target does not matter. A CZ is self-inverse, in other words, two neighboring CZ gates operating over the same set of qubits can be removed from the circuit without affecting its functionality. Any two CZ gates commute. This means that any pair of identical CZ gates can be removed and allows to express arbitrary CZ circuit over n qubits by listing a set of at most $n(n-1)/2$ pairs of qubits to which such gates apply. We further conclude that CZ circuits span the linear space $F_2^{n(n-1)/2}$ over the binary field F2:={0, 1}. A linear space has a basis, which will become an important consideration in future discussions. The standard basis is $\{CZ(i, j)|1 \le i < j \le n\}$.

Figure 6:
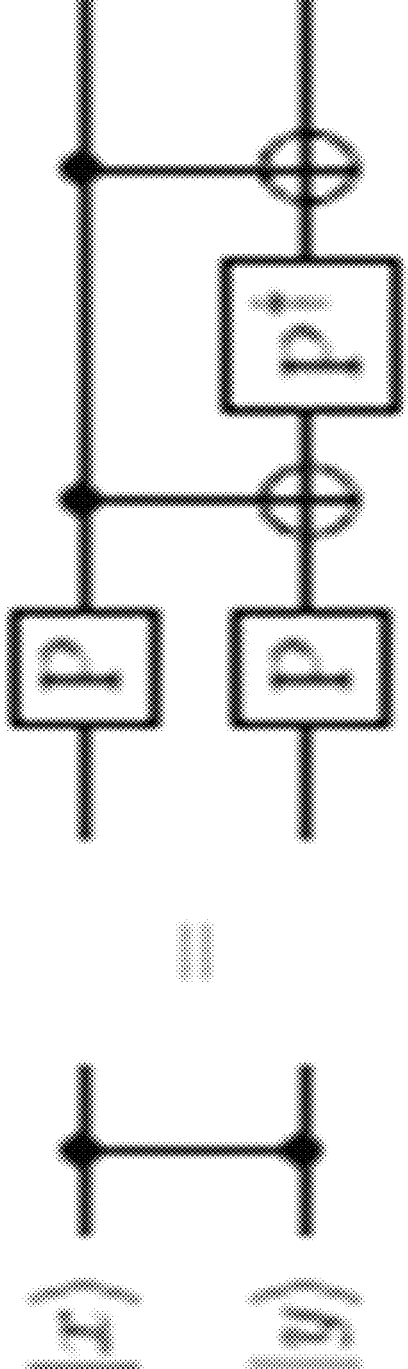
FIG. 6 is a circuit diagram in accordance with one or more embodiments.

FIG. 6 illustrates a basis for CZ circuits can be formed by the linear reversible circuits, via Phase gate applications, by considering phase polynomials. On the left hand side, we have a CZ(x, y) which applies the phase $-1^{x \cdot y} = i^{2x \cdot y}$; and on the right hand side, we have three phase gates, $P|x\rangle$, $P|y\rangle$, and $P†|x \oplus y\rangle$, which apply phases $i^x$, $i^y$ and $i^{-x \oplus y}$. The equality holds due to the identity $2x \cdot y \equiv x+y-x \oplus y \pmod 4$. Since the primary variables, x, y, are always free to be experience the application of P gates, it shows that the gate CZ(x, y) can be computed by P gate insertions in a linear reversible circuit that computes $x \oplus y$.

Furthermore, for a linear reversible circuit spanning qubits $x_1, x_2, \ldots, x_n$ and computing linear functions $x_i \oplus x_j$ for all i, j: $1 \le 1 < j \le n$ offers enough opportunity to insert Phase gates to compute arbitrary CZ gate transformation, since $\{CZ(i, j)|_{1 \le i < j \le n}\}$ is a basis. This observation leads to a simplified although equivalent construction, based on the qubit reversal circuit.

A linear function $x_1 \oplus x_2 \oplus \ldots \oplus x_k$ can thus be said to generate the set of CZ gates described by the circuit $\{CZ(xi, xj)|_{1 \le i < j \le k}\}$, assuming correcting Phase gates can be applied to the primary inputs, which is always the case for $\{P, CZ, CNOT\}$ circuits considered in this work. By variable renaming and embedding k-qubit space into larger n-qubit space we obtain vector representations of the phase application opportunity offered by the linear functions as the elements of the linear space $F_2^{n(n-1)/2}$. In this work, we focus on the discovery of a full CZ basis in the linear functions computed inside a -CNOT- stage as a means for merging -CZ- stage with the -CNOT- stage.

Additionally, a phase polynomial identity is:

$$a \oplus b \oplus c + a \oplus b + a \oplus c + b \oplus c + a + b + c \equiv 0 \pmod 4.$$

Here, each literal corresponds to some linear function of primary variables, a summand with the positive sign means the P gate is applied to it, a summand with the negative sign indicates the application of the P† gate to it, and the sum is taken modulo-4 to reflect the phase identity $i^4=1$. This seven-term identity implies that the set of seven Phase operations participating as summands results in a quantum circuit that computes the identity function. For the purpose of our work, Eq. (2) is a very important identity that establishes linear dependence of linear functions as vectors in the space $F_2^{n(n-1)/2}$—not to mistake with the linear dependence as regular linear functions. Applying this identity most frequently comes in the form of rewriting one of seven terms as a combination of the remaining six; it lies at the core of the constructions that follow Referring now to FIG. 3, at step 310 a quantum computing circuit may be received or created by algorithm preparation 221, and portions of the circuit may be transmitted/received by Quantum Circuit Transformation Module 299. The quantum computing circuit may be a Hadamard-free circuit which may be composed as a three-stage layered computation of a Phase layer (containing Phase gates), a CZ layer (containing CZ gates), and a CNOT layer (containing CNOT gates). It should be noted that the merging of the CZ layer into the CNOT layer can be done in instance in which there is no Phase layer, and in such instances Phase gates will be created for use with CNOT gates, rather than just updated as is the case in the three-stage layered computation.

Referring to step 320, the Quantum Circuit Transformation Module 299 merges the CZ layer into the CNOT layer, in whole for LNN architecture. As discussed above with reference to the first identity, since CZ gates can be performed as part of a linear reversible circuit with a phase insertion, and since a CNOT gate is a linear reversible circuit, CZ gates can be removed in instances in which a CNOT gate forms the bases of the CZ gate by including a phase gate into the CNOT gate. In instances of LNN architecture, methods of creating the CNOT layer create enough linear functions to induce all CZ gates, thus removing the CZ layer and creating a circuit having at most a 5n depth. Methods for implementing the Quantum Circuit Transformation Module 299 are described in more depth below in reference to FIG. 4 and FIG. 5. Following the merging, a modified quantum circuit is created having only a Phase layer and CNOT layer.

Referring to step 330, the modified quantum circuit may be sent to local classical controller 231. Local classical controller may instruct Classical-Quantum Interface 232 to create a series of signals (e.g., RF signals, DC pulses) that are sent to quantum processor 233 to implement the physical quantum states, and physically perform the gate operations set forth in the modified quantum circuit. As the depth of the circuit is reduced compared to the original circuit, error rates of the overall quantum circuit is reduced, leading to a more accurate result using less shots of the quantum system.

Figure 4:
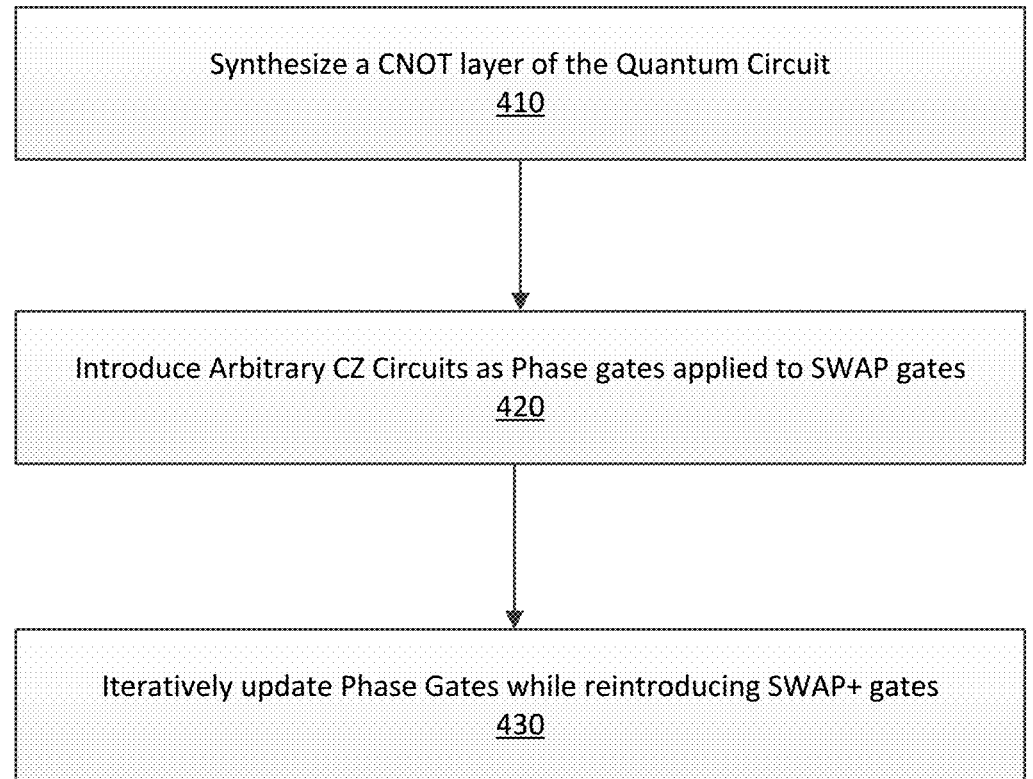
FIG. 4 depicts a process flow of reducing a quantum circuit of LNN architecture, according to an exemplary embodiment.

Referring now to FIG. 4, as step 410 a CNOT layer may be synthesized. The synthesis of the CNOT layer here was described by Samuel A Kutin, David Petrie Moulton, and Lawren M Smithline. Computation at a distance. arXiv preprint quantph/0701194, 2007; which is herein incorporated by reference. Since a -CNOT- transformation C corresponds to a reversible linear operation, we can represent C as an invertible n×n binary matrix $M_c$, where the $i^{th}$ column of $M_c$ represents the values stored in wire i at the end of operation C. The action of a CNOT gate corresponds to a column operation on $M_c$, since CNOT adds the content of its control wire onto its target wire. The synthesis of C using CNOT gates, therefore, corresponds to the diagonalization of $M_c$ via column operations. The diagonalization is done in two steps; first, Mc is transformed into a north-west matrix $M'_c$ using a CNOT network $C_1$ of depth at most 2n; and then, $M'_c$ is diagonalized using a sorting network $C_2$ of depth at most 3n. We say an n×n matrix N is north-west if all entries below the anti-diagonal are 0. That is, $N_{i,j}=0$ for all i+j>n+1.

The combined circuit $C_1 C_2$ diagonalizes $M_c$ and has depth at most 2n+3n=5n; therefore, $(C_1 C_2)-1$ is a depth-5n circuit that computes C.

Figure 7:
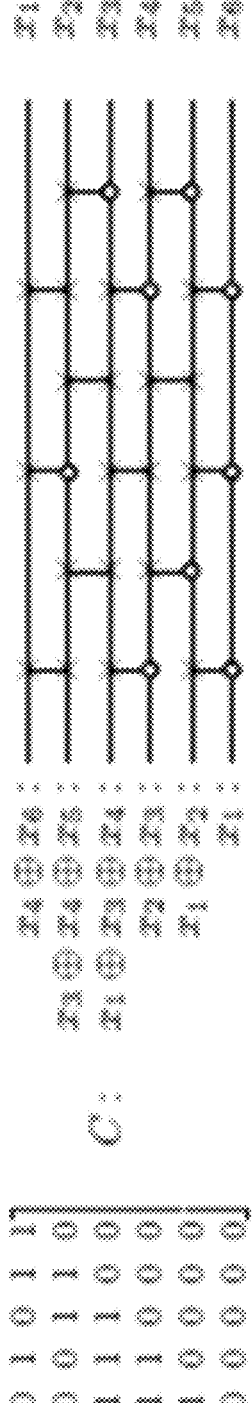
FIG. 7 is an illustration of a matrix that a diagonalization of a circuit in accordance with one or more embodiments.

FIG. 7 illustrates whether a box within the sorting network is SWAP or SWAP+ is determined by the corresponding north-west matrix. In fact, the correspondence between north-west matrices and such sorting networks is bijective since for any n, the set of n×n inevitable northwest matrices have $$(n2 - n)/2 = \binom{n}{2}$$

boolean degrees of freedom, on from each entry above the anti-diagonal; same as that of a set of sorting networks, where the $$\binom{n}{2}$$

sorting boxes contained can be either SWAP or SWAP+. For Example, Matrix M represents the northwest diagonalization of Circuit C.

Now, we will label wires and boxes of a sorting network and define an ordering on the boxes. Using the labeling and ordering, we will make several important observations of the sorting network that lie at the heart of the algorithm.

First, we will label each wire i with label n+1−i in the beginning. When a sorting box (either SWAP or SWAP+) acts on wires i, i+1 with labels $l_i$, $l_{i+1}$, we will swap the label of the wires. The label of a wire always equals to the largest index of the primary variables stored in that wire. For example, in the above example, the first wire initially holds x4⊕x6, corresponding to its label, 6. The sorting network is called the odd-even transposition sort. It can also be shown that for each pair of labels i≠j, there is exactly one box that shuffles i, j, and that the sorting box always shuffles the larger label downwards and the smaller label upwards. That is, whenever a box swaps two labels (i, j) 7→(j, i), i>j. It follows that we can uniquely label each box with two indices i, j, where i, j is the label of the wires it swaps.

Due to the above observations, boxes in diagonal layers share a common index. In particular, boxes in the same bottom-left to top-right diagonal layers shares a common smaller index, as illustrated in FIG. 2. We can label each diagonal layer by the index they share, which gives rise to the following sequence Pn={n−1, n−3, . . . , 1, . . . , n−4, n−2}.

Now, let us define an ordering on the sorting boxes:

Definition 1. Let {B, ≺} define the layer order on the set of boxes in an n-qubit sorting network, and let Pn={n−1, n−3, . . . , 1, . . . , n−4, n−2}. For two distinct boxes, box(i, j), box(k, l)∈B where i<j and k<l, let box(i, j)≺box(k, l) when i precedes k in Pn, and let box(i, j)=box(k, l) when i=k.

Boxes are ordered by the diagonal layers they belong to, from left to right. As the content of a wire travel from left to right, they either stays within the same layer (when the wire they are on is shuffled up), or they travel to the next layer (when the wire they are on is shuffled down, or left out of a round of shuffling).

Referring now to Step 420, a phase schedule may be constructed using the first circuit identity. An example algorithm to create this construction is given in the pseudocode outlined in FIG. 5A. The algorithm takes a list of phase gates and CZ gates in -P-CZ- and return the phase schedule in an n×n upper-triangular matrix S. Given S, we will apply $P^{S[i,i]}$ to $c_i$ and $P^{S[i,j]}$ to box(i, j). When C contains of only SWAPs, we can check that S indeed applies the correct phase, since $c_i=x_i$ and box(i, j) generates $x_i \oplus x_j$.

Referring now to Step 430, when C contains k SWAP+ gates, we can iteratively update the initial guess given by step 220 to obtain the correct phase schedule. An example algorithm to perform this update is given in the pseudo-code outlined in FIG. 5B. When C has k>0 SWAP+ boxes we consider the first SWAP+ in C by the layer order. If there are multiple, pick one arbitrarily. Let us refer to this box as box(i, j) where i, j are its labels, i<j. If we replace box(i, j) with SWAP, we obtain another circuit C' with corresponding matrix M' that has k−1 SWAP+.

When this occurs the circuit succeeding box(i, j) is identical in C and C' since the primary variables are recovered at end of both circuits. For all boxes box(k, l)≻box(i, j), box(k, l) generates the same linear function in C and C'. Additionally, the circuit preceding box(i, j) contains only SWAP boxes, which leaves the initial inputs unchanged. For all boxes box(k, l)≼ box(i, j), box(k, l) generates $c_i \oplus c_k$ in C and $c'_i \oplus c'_k$ in C'. From the above the linear function stored in each wire after layer i must be identical between C and C'. Matching the outputs of the boxes on layer i, we can show that all but one initial inputs of C and C' are identical; that is, ck=c'k for all k/=j, and c'j=ci⊕cj (or equivalently cj=c'i⊕c'j).

To summarize, the following follows from the above: Let us be given a northwest diagonalization circuit C with k SWAP+ boxes (k>0), and let C' be a northwest diagonalization circuit obtained by replacing the first (in layer order) SWAP+ box, labeled with (i, j), i<j. Let ci and $c'_i$ be the initial inputs of circuit C and C' respectively. Then: 1. Exactly one initial input of C and C' differs. That is, $c_j=c'_j \oplus c'_i$, and $c_k=c'_k$ for all k/=j. Thus, At most n−1 boxes generate different linear functions in C and C'. In particular, box(k, j) generates a different linear function in C and C' if and only if box(k, j)≼ box(i, j). box(k, j) generates $c_k \oplus c_j$ in C, and $c'_k \oplus c'_j = ck \oplus c_i \oplus c_j$ in C'. Thus, the set of linear functions generated by C' forms a basis for the space of CZ circuits. By adding one SWAP+ box, only O(n) linear functions generated are different by the addition of one initial input. Now, we will show in that we could always "fix" each of these different linear functions with constantly many linear functions generated in C, which would suggest that C also generates a set of linear functions that form a basis in the space of CZ circuits.

In merging the CZ gates into the CNOT gates we can first construct a sequence of circuits $\{C,C',\ldots,C^{(k)}\}$, where $C^{(i)}$ is constructed by replacing the first SWAP+ box in $C^{(j-1)}$ with SWAP. Then, the algorithm from Step 420 is used to find the initial phase schedule, $S^{(k)}$, which would induce the desired phase on $C^{(k)}$, since $C^{(k)}$ consists of only SWAP. Once we know how to induce -P-CZ- on $C^{(k)}$, we will apply the following cases:

1. P gate applied to $c'_j$ in C' is equivalent to P gate applied to box (i, j) in C.
2. P gate applied to box (i, j) in C' is equivalent to P gate applied to $c_j$ in C.
3. For box (k, j)≺box (i, j), P gate applied to box (k, j) in C' is equivalent to a schedule of $P^\dagger$ gates applied to $c_i$, $c_j$, $c_k$, box (i, j), box (i, k), and box (j, k) in C. This may be performed during the modification of phase gates when each SWAP+ gate is reintroduced.
4. P gate applied to any other locations in C' is equivalent to P applied to the same location in C.

We repeat the process to find an updated phase schedule $S^{(i)}$, which would induce -P-CZ- on $C^{(i)}$, for all i∈{k−1, k−2, . . . , 0}. After k iterations, we will obtain a series of phase gates, S, that induce -P-CZ- on the CNOT layer, C, as desired, thereby eliminating the CZ layer from the modified Quantum Circuit.

Following the performance of step 430, a modified quantum circuit may be created for an LNN hardware architecture that may be implemented in a depth of 5n. Such modified quantum circuit is accomplished by identifying operations in the CZ layer that share the same reversible linear operation as CNOT gates in the CNOT layer and including a phase gate to the CNOT gate that achieves the same, or substantially similar, result as the original quantum circuit.

Further, below methods and explanation may further explain methodologies used by Quantum Circuit Transformation Module 299, or prove it's efficacy. [Insert completed paper]

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a classical computer, a quantum circuit comprising a CZ layer and a CNOT layer;
   creating, by the classical computer, a modified quantum circuit based on the CZ layer and the CNOT layer, wherein the modified quantum circuit includes phase gates with CNOT gates that perform functions of CZ gates in the CZ layer; and
   performing, on a quantum computer, the modified quantum circuit.

2. The method of claim 1, wherein the quantum circuit further comprises a phase layer including one or more phase gates, and wherein creating the modified quantum circuit includes modifying phase gates of the phase layer based on the CZ gates in the CZ layer.

3. The method of claim 1, wherein creating the modified quantum circuit comprises:
   determining a CNOT gate of the CNOT layer corresponding to a CZ gate of the CZ layer, wherein an operation performed by the CZ gate is included in an operation of the CNOT gate;
   determining one or more phase gates to apply to one or more CNOT gates such that the operation of the one or more phase gates and the one or more CNOT gates provides the same result as the CZ layer and the CNOT layer.

4. The method of claim 1, wherein the CNOT layer comprises swap gates and swap+ gates, and wherein creating the modified quantum circuit comprises:
   determining an initial phase gate for each CNOT gate, wherein the phase gate is applied as a swap gate containing an equivalent calculation to a CZ gate from the CZ layer;
   for each swap+ gate:

replace the swap gate used to determine the initial phase gate with a swap+ gate; and determine an updated phase gate based on the replaced swap+ gate; and repeat until all swap+ gates in original CNOT layer are introduced and an updated phase gate layer is created.

5. The method of claim 4, wherein determining the initial phase gate comprises applying a phase gate to each swap gate containing an equivalent calculation to a CZ gate from the CZ layer.

6. The method of claim 4, wherein determining the updated phase gates comprises updating six phase gates.

7. A system comprising one or more processors, one or more computer readable memories, one or more computer readable storage devices, one or more computer-readable storage devices, and program instructions stored on the one or more computer readable storage devices for execution by one or more processors via the one or more memories, the program instructions comprising instructions for:

receiving, by a classical computer, a quantum circuit comprising a CZ layer and a CNOT layer;

creating, by a classical computer, a modified quantum circuit based on the CZ layer and the CNOT layer, wherein the modified quantum circuit includes phase gates with CNOT gates that perform functions of CZ gates in the CZ layer; and performing, on a quantum computer, the modified quantum circuit.

8. The system of claim 7, wherein the quantum circuit further comprises a phase layer including one or more phase gates, and wherein creating the modified quantum circuit includes modifying phase gates of the phase layer based on the CZ gates in the CZ layer.

9. The system of claim 7, wherein creating the modified quantum circuit comprises:

determining a CNOT gate of the CNOT layer corresponding to a CZ gate of the CZ layer, wherein an operation performed by the CZ gate is included in an operation of the CNOT gate;

determining one or more phase gates to apply to one or more CNOT gates such that the operation of the one or more phase gates and the one or more CNOT gates provides the same result as the CZ layer and the CNOT layer.

10. The system of claim 7, wherein the CNOT layer comprises swap gates and swap+ gates, and wherein creating the modified quantum circuit comprises:

determining an initial phase gate for each CNOT gate, wherein the phase gate is applied as a swap gate containing an equivalent calculation to a CZ gate from the CZ layer;

for each swap+ gate:

replace the swap gate used to determine the initial phase gate with a swap+ gate; and determine an updated phase gate based on the replaced swap+ gate; and repeat until all swap+ gates in original CNOT layer are introduced and an updated phase gate layer is created.

11. The system of claim 10, wherein determining the initial phase gate comprises applying a phase gate to each swap gate containing an equivalent calculation to a CZ gate from the CZ layer.

12. The system of claim 10, wherein determining the updated phase gates comprises updating six phase gates.

13. A computer program product comprising one or more processors, one or more computer readable memories, one or more non-transitory computer readable storage devices, and program instructions stored on the one or more computer readable storage devices for execution by one or more processors via the one or more memories, the program instructions comprising instructions for:

receiving, by a classical computer, a quantum circuit comprising a CZ layer and a CNOT layer;

creating, by a classical computer, a modified quantum circuit based on the CZ layer and the CNOT layer, wherein the modified quantum circuit includes phase gates with CNOT gates that perform functions of CZ gates in the CZ layer; and performing, on a quantum computer, the modified quantum circuit.

14. The computer program product of claim 13, wherein the quantum circuit further comprises a phase layer including one or more phase gates, and wherein creating the modified quantum circuit includes modifying phase gates of the phase layer based on the CZ gates in the CZ layer.

15. The computer program product of claim 13, wherein creating the modified quantum circuit comprises: determining a CNOT gate of the CNOT layer corresponding to a CZ gate of the CZ layer, wherein an operation performed by the CZ gate is included in an operation of the CNOT gate; and determining one or more phase gates to apply to one or more CNOT gates such that the operation of the one or more phase gates and the one or more CNOT gates provides the same result as the CZ layer and the CNOT layer.

16. The computer program product of claim 13, wherein the CNOT layer comprises swap gates and swap+ gates, and wherein creating the modified quantum circuit comprises: determining an initial phase gate for each CNOT gate, wherein the phase gate is applied as if it were a swap gate containing an equivalent calculation to a CZ gate from the CZ layer; for each swap+ gate: replace the swap gate used to determine the initial phase gate with a swap+ gate; and determine an updated phase gate based on the replaced swap+ gate; and repeat until all swap+ gates in original CNOT layer are introduced and an updated phase gate layer is created.

17. The computer program product of claim 16, wherein the determining the initial phase gate comprises applying a phase gate to each swap gate containing an equivalent calculation to a CZ gate from the CZ layer.

* * * * *